United States Patent  (10) Patent No.: US 8,639,238 B2
Kobayashi et al.  (45) Date of Patent: Jan. 28, 2014

(54) QUALITY MONITORING SYSTEM, QUALITY MONITORING APPARATUS, AND QUALITY MONITORING METHOD IN WIRELESS COMMUNICATION NETWORK

(75) Inventors: Kosei Kobayashi, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 212 days.

(21) Appl. No.: 13/063,857

(22) PCT Filed: Aug. 26, 2009

(86) PCT No.: PCT/JP2009/064851
§ 371 (c)(1),
(2), (4) Date: Mar. 14, 2011

(87) PCT Pub. No.: WO2010/055721
PCT Pub. Date: May 20, 2010

(65) Prior Publication Data
US 2011/0263244 A1    Oct. 27, 2011

(51) Int. Cl.
*H04W 24/00* (2009.01)
(52) U.S. Cl.
USPC ........ 455/423; 455/441; 455/425; 455/452.1; 455/446; 455/63.4
(58) Field of Classification Search
USPC ............. 455/441, 423, 425, 452.1, 446, 63.4, 455/422.1
See application file for complete search history.

(56) References Cited

U.S. PATENT DOCUMENTS 5,548,806 A * 8/1996 Yamaguchi et al. .......... 455/441
8,477,754 B2 * 7/2013 Kakura ........................ 370/342
2005/0164706 A1 * 7/2005 Wakabayashi ............... 455/441
2006/0014558 A1 * 1/2006 Takaki ......................... 455/522
2006/0135150 A1 * 6/2006 Oh .............................. 455/425
2008/0146218 A1 * 6/2008 Shimomura et al. ......... 455/425
2008/0171516 A1 * 7/2008 Kakura ........................ 455/63.4
2011/0263244 A1 * 10/2011 Kobayashi et al. ........... 455/423

FOREIGN PATENT DOCUMENTS

JP    2006005597 A    1/2006
JP    2008092421 A    4/2008
JP    2008109571 A    5/2008
JP    2008532416 A    8/2008

OTHER PUBLICATIONS

International Search Report for PCT/JP2009/064851 mailed Oct. 27, 2009.
3GPP TS 32.403, V.7.1.0, Technical Specification Group Services and System Aspects: Telecommunication management; Performance management (PM): Petformance measurements—UMTS and combined UMTS/GSM (Release 7), Dec. 2005.
3GPP TS 32.410, V.0.0.6, Technical Specification Group Services and System Aspects; Telecommunication management; Key Performance Indicators (KPI) for UMTS/GSM (Release 8), Apr. 2008, pp. 1-15.

* cited by examiner

*Primary Examiner* — David Q Nguyen (57) ABSTRACT

A mobile terminal includes a measuring unit that measures at least the moving speed of the self terminal and communication quality of wireless communication, and a communication unit that transmits terminal information including moving speed information and communication quality information. A quality monitoring apparatus (90) includes a terminal information collection unit (901) that collects the terminal information from at least one mobile terminal, and a terminal information classification unit (903) and a quality analyzing unit (904) that monitor communication quality in a predetermined target area for each moving speed range of the mobile terminal based on the collected terminal information.

21 Claims, 8 Drawing Sheets

| DATE/TIME | POSITION INFORMATION (LATITUDE/ LONGITUDE) | SCRAMBLING CODE | MOVING SPEED [km/h] | COMMUNICA- TION TYPE | CALL PROCESSING TYPE | SUCCESS/ FAILURE TYPE |
|---|---|---|---|---|---|---|
| 2008/4/1 08:30 | N35° 34' 21" E139°39' 59" | 10 | 2 | STREAMING | RADIO ACCESS BEARER RELEASE | SUCCESS |
| 2008/4/1 12:15 | N35° 34' 19" E139°39' 58" | 10 | 15 | PACKET | RADIO ACCESS BEARER ESTABLISHMENT | FAILURE |
| 2008/4/2 15:40 | N35° 34' 29" E139°39' 53" | 25 | 50 | VOICE | HANDOVER | FAILURE |
| ... | ... | ... | ... | ... | ... | ... |

FIG. 7

| DATE/TIME | POSITION INFORMATION (LATITUDE/ LONGITUDE) | SCRAMBLING CODE | MOVING SPEED [km/h] | PACKET THROUGHPUT [Mbps] | PACKET TRANSFER DELAY [ms] |
|---|---|---|---|---|---|
| 2008/4/1 08:30 | N35° 34' 21" E139°39' 59" | 10 | 2 | 1.00 | 80 |
| 2008/4/1 12:15 | N35° 34' 19" E139°39' 58" | 10 | 15 | 0.50 | 100 |
| 2008/4/2 15:40 | N35° 34' 29" E139°39' 53" | 25 | 50 | 0.38 | 200 |
| ... | ... | ... | ... | ... | ... |

QUALITY MONITORING SYSTEM, QUALITY MONITORING APPARATUS, AND QUALITY MONITORING METHOD IN WIRELESS COMMUNICATION NETWORK

This application is the National Phase of PCT/JP2009/064851, filed Aug. 26, 2009, which is based upon and claims the benefit of priority from Japanese patent application No. 2008-291841, filed on Nov. 14, 2008, the disclosure of which is incorporated herein in its entirety by reference.

TECHNICAL FIELD

The present invention relates to a quality monitoring system in a wireless communication network and, more particularly, to a quality monitoring system, a quality monitoring apparatus, and a quality monitoring method in a wireless communication network, which can monitor communication quality for each moving speed range of a mobile terminal.

BACKGROUND ART

In a wireless communication network, generally, a call processing log is stored in a network-side communication apparatus, and quality monitoring is performed based on a communication quality index value calculated from the log.

As an example, the wireless base station control apparatus of a mobile communication network based on the specifications of 3GPP (3rd Generation Partnership Program) measures and records the attempt and failure counts of radio access bearer establishment, handover, and the like for each wireless cell as a call processing log to be transmitted/received to/from a mobile terminal on the control plane, as defined in reference "3GPP TS 32.403, "Telecommunication management; Performance management (PM); Performance measurements—UMTS and combined UMTS/GSM (Release 7)", 2005" (to be referred to as reference 1 hereinafter). The wireless base station control apparatus obtains KPI (Key Performance Indicator) values such as a radio access bearer establishment failure rate and a handover failure rate, which are defined in reference "3GPP TS 32.410, "Telecommunication management; Key Performance Indicators (KPI) for UMTS and GSM (Release 8)", 2008" (to be referred to as reference 2 hereinafter), from the measured values and uses them for quality monitoring.

Another technique is also known, which causes not the network-side communication apparatus but a mobile terminal to measure quality information and causes a server to collect the quality information by transmission on the user plane and monitor communication quality.

For example, a system disclosed in Japanese Patent Laid-Open No. 2008-109571 statistically processes network quality information collected from mobile terminals for each unit area, calculates quality statistics in each unit area, and uses them for quality monitoring.

There is also known a technique of causing a mobile terminal to control communication quality. For example, a mobile communication system disclosed in Japanese Patent Laid-Open No. 2008-092421 causes a mobile terminal to detect the moving speed of its own and determine a communication data format for wireless communication with a wireless base station based on the detected moving speed.

DISCLOSURE OF INVENTION

Problems to be Solved by the Invention

In general, when designing wireless areas by, for example, setting wireless base station installation points and adjusting their antenna tilt angles, communication quality can sometimes be improved by optimizing the wireless areas in consideration of user's moving characteristic therein. For example, a cellular mobile communication network maintains communication by handover when a user moves through wireless cells. The overlap areas between the wireless cells where handover is executed are designed based on the moving speed distributions of users who move near those areas. On, for example, a national road where many users move at high speed, it is necessary to ensure extra overlap areas between the wireless cells not to cause handover delay.

However, the quality monitoring systems disclosed in reference 1, reference 2, and Japanese Patent Laid-Open No. 2008-109571 cannot confirm the relationship between the user's moving speed and the communication quality. For this reason, it is impossible to determine whether wireless area design is appropriately done according to the user's moving characteristic. That is, none of the techniques disclosed in reference 1, reference 2, and Japanese Patent Laid-Open No. 2008-109571 takes the speed of a mobile terminal into consideration when calculating quality statistics. Hence, when communication quality has degraded, whether the degradation in the communication quality has occurred due to the user's moving characteristic cannot be determined.

On the other hand, the system disclosed in Japanese Patent Laid-Open No. 2008-092421 considers the variation in the communication quality caused by the movement of a mobile terminal. The system disclosed in Japanese Patent Laid-Open No. 2008-092421 however assumes to define the correspondence between communication quality and the moving speed of a mobile terminal in advance and use the predefined relationship. More specifically, the system disclosed in Japanese Patent Laid-Open No. 2008-092421 causes the mobile terminal to store in advance the relationship between the communication data format and the moving speed of the mobile terminal and determine the communication data format based on the measured moving speed of its own. For this reason, the system disclosed in Japanese Patent Laid-Open No. 2008-092421 cannot monitor the correspondence between the communication quality and the moving speed of the mobile terminal for each wireless area, and therefore cannot determine whether wireless area design of, for example, the overlap areas between the wireless cells is appropriately done in consideration of the user's moving characteristic in the wireless areas.

The present invention has been made in consideration of the above-described problems, and has as its exemplary object to allow a quality monitoring system in a wireless communication network to monitor the correspondence between communication quality and the moving speed of a mobile terminal for each area.

Means of Solution to the Problems

A quality monitoring system in a wireless communication network according to an exemplary aspect of the invention includes at least one mobile terminal, and a quality monitoring apparatus, the mobile terminal including measuring means for measuring at least a moving speed of a self terminal and communication quality of wireless communication, and communication means for transmitting terminal information including moving speed information and communication quality information, and the quality monitoring apparatus including terminal information collection means for collecting the terminal information from the at least one mobile terminal, and analyzing means for monitoring communication quality in a predetermined target area for each moving speed range of the mobile terminal based on the collected terminal information.

A quality monitoring apparatus in a wireless communication network according to an exemplary aspect of the invention includes terminal information collection means for collecting, from at least one mobile terminal, terminal information including at least moving speed information and communication quality information, and analyzing means for monitoring communication quality in a predetermined target area for each moving speed range of the mobile terminal based on the collected terminal information.

A quality monitoring method in a wireless communication network according to an exemplary aspect of the invention includes the measuring procedure of causing at least one mobile terminal to measure at least a moving speed of a self terminal and communication quality of wireless communication, the transmission procedure of causing the mobile terminal to transmit terminal information including moving speed information and communication quality information, the terminal information collection procedure of causing a quality monitoring apparatus. to collect the terminal information from the at least one mobile terminal, and the analyzing procedure of causing the quality monitoring apparatus to monitor communication quality in a predetermined target area for each moving speed range of the mobile terminal based on the collected terminal information.

Effects of the Invention

According to the present invention, terminal information is classified by the moving speed range, and quality statistics specific to each moving speed range are obtained. This enables to grasp the relationship between the communication quality and the moving speed of the mobile terminal. It is therefore possible to determine, when communication quality has degraded, whether the degradation in the communication quality has occurred due to the user's moving characteristic in that area. In addition, the correspondence between the communication quality and the moving speed of the mobile terminal changes depending on whether the wireless area design of the overlap areas between wireless cells and the like is appropriately done. In the present invention, the correspondence between the communication quality and the moving speed of the mobile terminal can be analyzed based on the terminal information collected from the mobile terminal. According to the present invention, it is consequently possible to determine whether wireless area design is appropriately done according to the user's moving characteristic in the area.

BEST MODE FOR CARRYING OUT THE INVENTION

[First Exemplary Embodiment]

Figure 1:
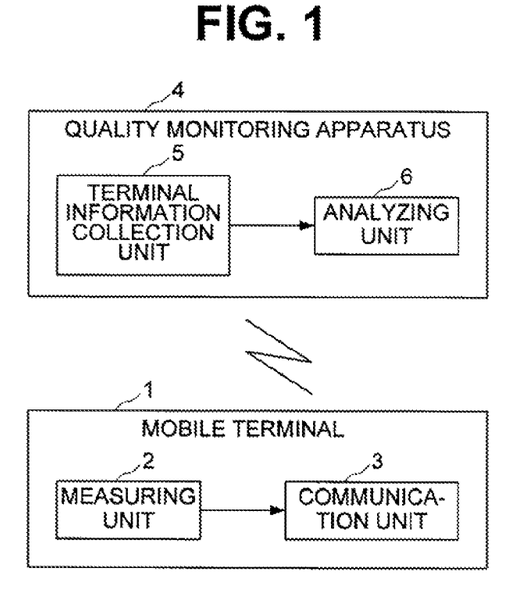
FIG. 1 is a block diagram showing the arrangement of a mobile communication network according to the first exemplary embodiment of the present invention.

The first exemplary embodiment to practice the present invention will be described in detail with reference to the accompanying drawings. FIG. 1 is a block diagram showing the arrangement of a mobile communication network according to the first exemplary embodiment of the present invention. A mobile terminal 1 has a wireless communication function, and includes a measuring unit 2 configured to measure at least the moving speed of the self terminal and the communication quality of wireless communication, and a communication unit 3 configured to transmit terminal information including moving speed information and communication quality information.

The measuring unit 2 measures the moving speed of the self terminal. The moving speed can be measured by a general speed sensor and acceleration sensor. It is also possible to measure the position of the self terminal using, for example, a GPS (Global Positioning System) and obtain the moving speed of the self terminal by time derivative of the position.

The measuring unit 2 also measures the communication quality of wireless communication. The items of communication quality include a communication type such as voice communication, packet communication, or streaming communication, a call processing type such as radio access bearer establishment/release or handover, a call processing success/failure type, a packet transfer throughput, and a packet transfer delay.

The communication unit 3 transmits, to a quality monitoring apparatus 4, terminal information including the information of the moving speed and the information of the communication quality measured by the measuring unit 2. A wireless base station (not shown) for relaying communication, a mobile communication core network (not shown), and the like may exist between the mobile terminal 1 and the quality monitoring apparatus 4, as a matter of course. When transmitting the terminal information, the communication unit 3 may add terminal identification information to identify the self terminal to the terminal information.

The quality monitoring apparatus 4 includes a terminal information collection unit 5 configured to collect the terminal information transmitted from the mobile terminal 1, and an analyzing unit 6 configured to monitor communication quality in a predetermined target area for each moving speed range of the mobile terminal based on the collected terminal information. Note that FIG. 1 illustrates only one mobile terminal 1 for the descriptive convenience. In fact, the system can target a plurality of mobile terminals 1 that are present in the area.

[Description of Operation]

Figure 2:
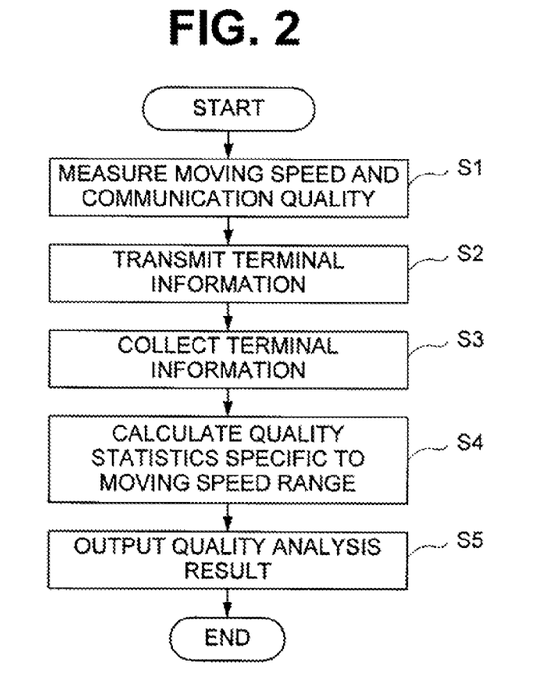
FIG. 2 is a flowchart illustrating an example of the quality monitoring operation of the mobile communication network according to the first exemplary embodiment of the present invention.

The quality monitoring operation of the mobile communication network according to the first exemplary embodiment will be described next with reference to the flowchart of FIG. 2.

The measuring unit 2 of the mobile terminal 1 measures the moving speed of the self terminal and the communication quality of wireless communication (step S1).

The communication unit 3 of the mobile terminal 1 transmits terminal information including the moving speed information and the communication quality information to the quality monitoring apparatus 4 (step S2).

The terminal information collection unit 5 of the quality monitoring apparatus 4 collects the terminal information transmitted from the mobile terminal 1 (step S3).

The analyzing unit 6 of the quality monitoring apparatus 4 acquires the terminal information of each mobile terminal that exists in a predetermined target area from the 10 ; terminal information collected by the terminal information collection unit 5, classifies the pieces of acquired terminal information by the moving speed range, and obtains quality statistics specific to each moving speed range (step S4). The moving speed ranges mean divided moving speed ranges of, for example, 0 km/h (inclusive) to 5 km/h (exclusive), 5 km/h (inclusive) to 20 km/h (exclusive), 20 km/h (inclusive) to 60 km/h (exclusive), 60 km/h (inclusive) to 100 km/h (exclusive), and 100 km/h or more. The predetermined target area can be a wireless cell that is the communication service providing range of a wireless base station, a specific prefecture or municipality, a specific rectangular area, or the like.

Finally, the analyzing unit 6 outputs the quality analysis result via an output device such as a display and ends the quality analysis processing (step S5).

As described above, in the first exemplary embodiment of the present invention, terminal information is classified by the moving speed of a mobile terminal, and quality statistics specific to each moving speed range are obtained. This allows to grasp the relationship between the communication quality and the moving speed of the mobile terminal. It is therefore possible to determine, when communication quality has degraded, whether the degradation in the communication quality has occurred due to the user's moving characteristic in that area.

Additionally, in the first exemplary embodiment of the present invention, the correspondence between the communication quality and the moving speed of the mobile terminal is assumed to change depending on the wireless area. It is therefore possible to analyze the correspondence between the communication quality and the moving speed of the mobile terminal for each wireless area based on the terminal information collected from the mobile terminal. That is, the first exemplary embodiment of the present invention makes it possible to monitor the correspondence between the communication quality and the moving speed of the mobile terminal for each area considering that the correspondence between the communication quality and the moving speed of the mobile terminal changes depending on whether the wireless area design of the overlap areas between wireless cells and the like is appropriately done.

On the other hand, the system disclosed in Japanese Patent Laid-Open No. 2008-092421 does not analyze moving speed specific quality statistics for each area. That is, the system disclosed in Japanese Patent Laid-Open No. 2008-092421 assumes to fix the correspondence between communication quality and the moving speed of a mobile terminal independently of the area and use the predefined correspondence. For this reason, the system disclosed in Japanese Patent Laid-Open No. 2008-092421 cannot monitor the correspondence between the communication quality and the moving speed of the mobile terminal for each wireless area, and therefore cannot determine whether wireless area design is appropriately done according to the user's moving characteristic in the areas.

[Second Exemplary Embodiment]

The second exemplary embodiment to practice the present invention will be described next in detail with reference to the accompanying drawings. In the second exemplary embodiment, the first exemplary embodiment will be described in more detail, and the first exemplary embodiment is applied to a cellular mobile communication network. However, the present invention is not limited to the cellular mobile communication network and is also applicable to other wireless communication networks such as a wireless LAN (Local Area Network) and a WiMAX (Worldwide. Interoperability for Microwave Access) network.

[Description of Arrangement]

Figure 3:
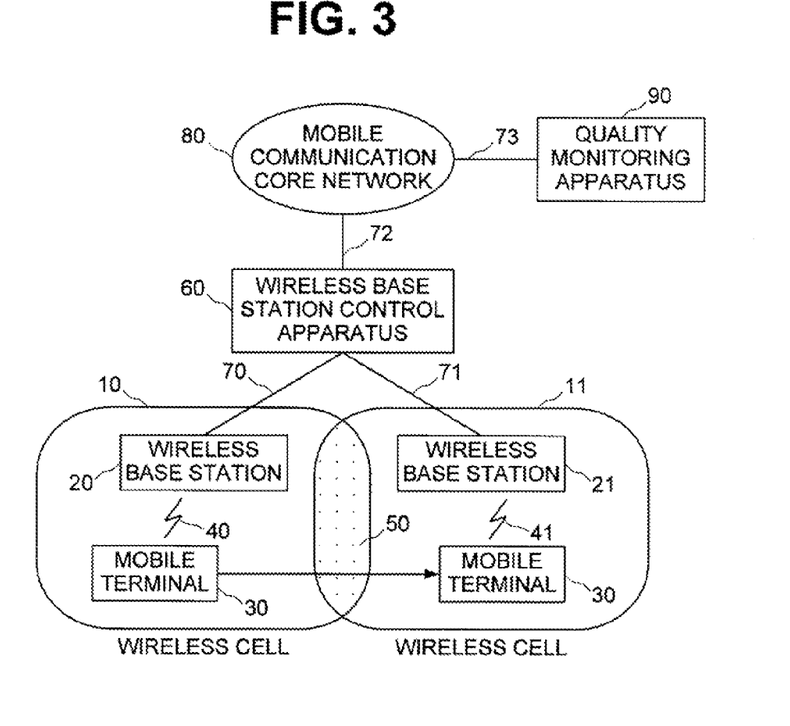
FIG. 3 is a block diagram showing the arrangement of a mobile communication network according to the second exemplary embodiment of the present invention.

FIG. 3 is a block diagram showing the arrangement of a mobile communication network according to the second exemplary embodiment of the present invention. A wireless cell 10 is the communication service providing range of a wireless base station 20. A wireless cell 11 is the communication service providing range of a wireless base station 21. A mobile terminal 30 existing in the wireless cell 10 communicates with the wireless base station 20 via a wireless link 40. When the mobile terminal 30 moves from the wireless cell 10 to the wireless cell 11 during the communication, handover is executed in an overlap area 50 between the wireless cell 10 and the wireless cell 11 so that the mobile terminal 30 is connected to the wireless base station 21 via a wireless link 41.

A wireless base station control apparatus 60 is connected to the subordinate wireless base stations 20 and 21 via wired links 70 and 71, respectively, to transmit/receive communication traffic and control traffic to/from the wireless base stations 20 and 21. The wireless base station control apparatus 60 is also connected to a mobile communication core network 80 via a wired link 72 to transmit/receive communication traffic and control traffic.

A quality monitoring apparatus 90 is connected to the mobile communication core network 80 via a wired link 73 to collect terminal information transmitted from the mobile terminal 30 and monitor communication quality. Note that the quality monitoring apparatus 90 may be connected to the wireless base station control apparatus 60 or an external network (not shown) to collect terminal information from the mobile terminal 30 via the wireless base station control apparatus 60 or the external network.

The arrangements of the mobile terminal 30 and the quality monitoring apparatus 90 according to the second exemplary embodiment will be described next. Note that the remaining constituent elements in FIG. 3 are not directly relevant to the present invention, and a detailed description thereof will be omitted.

Figure 4:
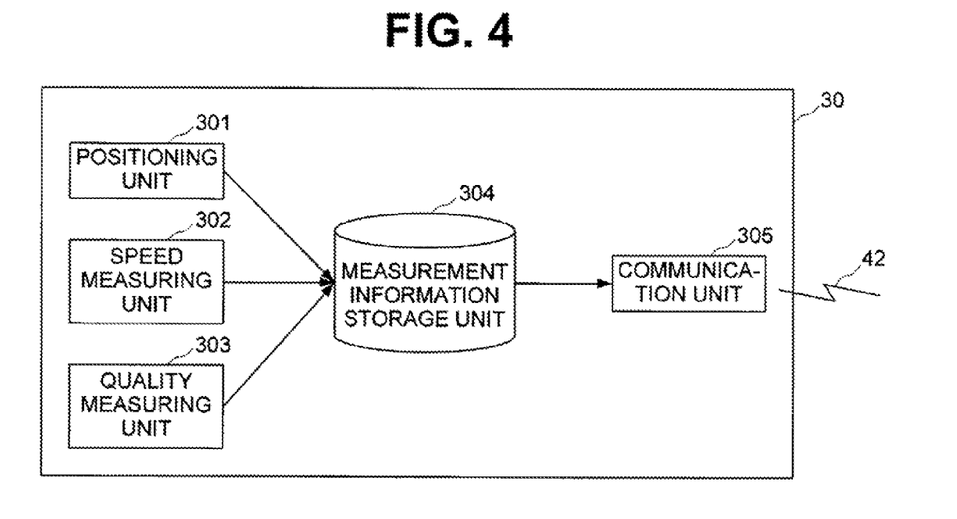
FIG. 4 is a block diagram showing the arrangement a mobile terminal according to the second exemplary embodiment of the present invention.

The arrangement of the mobile terminal 30 will be described with reference to FIG. 4. The mobile terminal 30 includes a positioning unit 301 configured to measure the position of the self terminal, a speed measuring unit 302 configured to measure the moving speed of the self terminal, a quality measuring unit 303 configured to measure the communication quality of wireless communication, a measurement information storage unit 304 configured to store the measurement information measured by the positioning unit 301, the speed measuring unit 302, and the quality measuring unit 303, and a communication unit 305 configured to connect the terminal to a wireless base station via a wireless link. The positioning unit 301, the speed measuring unit 302, and the quality measuring unit 303 constitute a measuring means corresponding to the measuring unit 2 in FIG. 1.

The positioning unit 301 measures the position of the self terminal using a GPS, or obtains the position of the self terminal by calculation based on the positions of a plurality of wireless base stations and the time lag between radio waves arriving from those wireless base stations.

The speed measuring unit 302 measures the moving speed of the self terminal by a general speed sensor and acceleration sensor or time derivative of the position measured by the positioning unit 301.

The quality measuring unit 303 measures communication quality. Items to be measured by the quality measuring unit 303 include a communication type such as voice communication, packet communication, or streaming communication, a call processing type such as radio access bearer establishment/release or handover, a success/failure type representing whether call processing such as radio access bearer establishment/release or handover has normally ended, a packet transfer throughput, and a packet transfer delay.

The measurement information storage unit 304 serves as a means for storing the pieces of measurement information obtained by the positioning unit 301, the speed measuring unit 302, and the quality measuring unit 303 in association with each other. More specifically, the measurement information storage unit 304 acquires the position and moving speed at the time of quality measurement by the quality measuring unit 303 from the positioning unit 301 and the speed measuring unit 302, and stores the position and moving speed in association with quality information measured by the quality measuring unit 303. Note that as the position and moving speed, the average values for N sec from the start of communication, the average values for N sec before the end of communication, the average values from the start to the end of communication, the average values for N sec immediately before or immediately after occurrence of a call processing event such as handover, or the like can be used. Normally, the average values of the position and moving speed measured by the positioning unit 301 and the speed measuring unit 302 for N sec before the end of communication are adopted as the values of the position and moving speed.

The communication unit 305 serves as a means for connecting the terminal to a wireless base station via a wireless link to perform wireless communication. The communication unit 305 transmits, to the quality monitoring apparatus 90, terminal information including the information stored in the measurement information storage unit 304 and a scrambling code received from the wireless base station. The terminal information transmission time can be set to a predetermined period, a time designated by the terminal user, the communication end time, the time immediately after handover, or a time designated by the quality monitoring apparatus 90. When transmitting the terminal information, the communication unit 305 may add terminal identification information to identify the self terminal to the terminal information.

Figure 5:
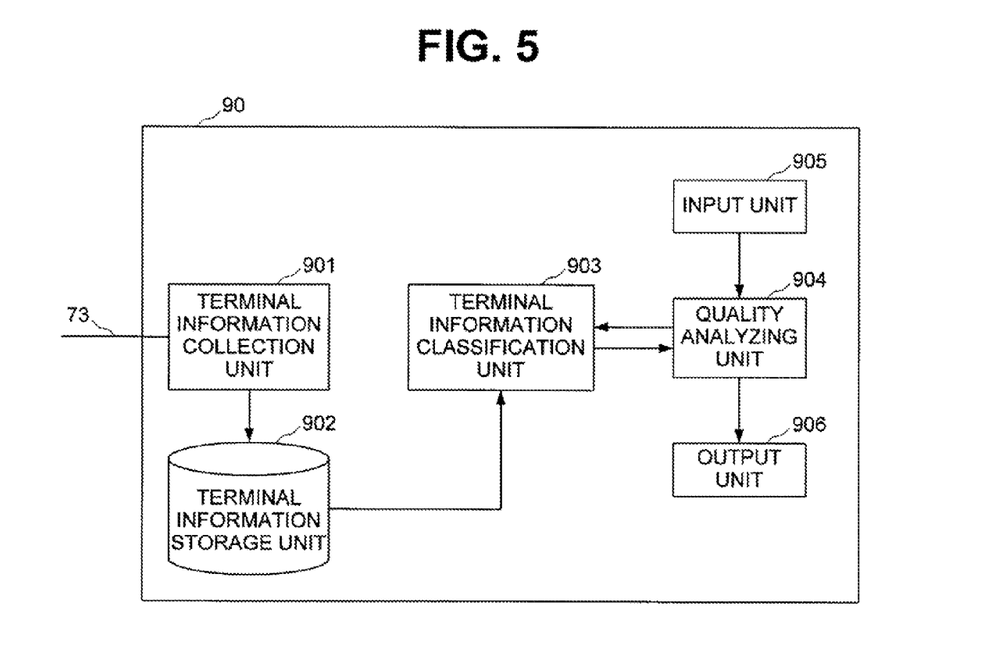
FIG. 5 is a block diagram showing the arrangement of a quality monitoring apparatus according to the second exemplary embodiment of the present invention.

The arrangement of the quality monitoring apparatus 90 will be described next with reference to FIG. 5. The quality monitoring apparatus 90 includes a terminal information collection unit 901 configured to collect terminal information transmitted from the mobile terminal 30, a terminal information storage unit 902 configured to store the collected terminal information, a terminal information classification unit 903 configured to classify the terminal information by the moving speed range of the mobile terminal 30, a quality analyzing unit 904 configured to totalize the terminal information for each moving speed range and obtain quality statistics specific to each moving speed range, an input unit 905 configured to input a quality analysis instruction and conditions for quality analysis, and an output unit 906 configured to output the quality analysis result of the quality analyzing unit 904. The terminal information storage unit 902, the terminal information classification unit 903, the quality analyzing unit 904, the input unit 905, and the output unit 906 constitute an analyzing means corresponding to the analyzing unit 6 in FIG. 1.

Figure 6:
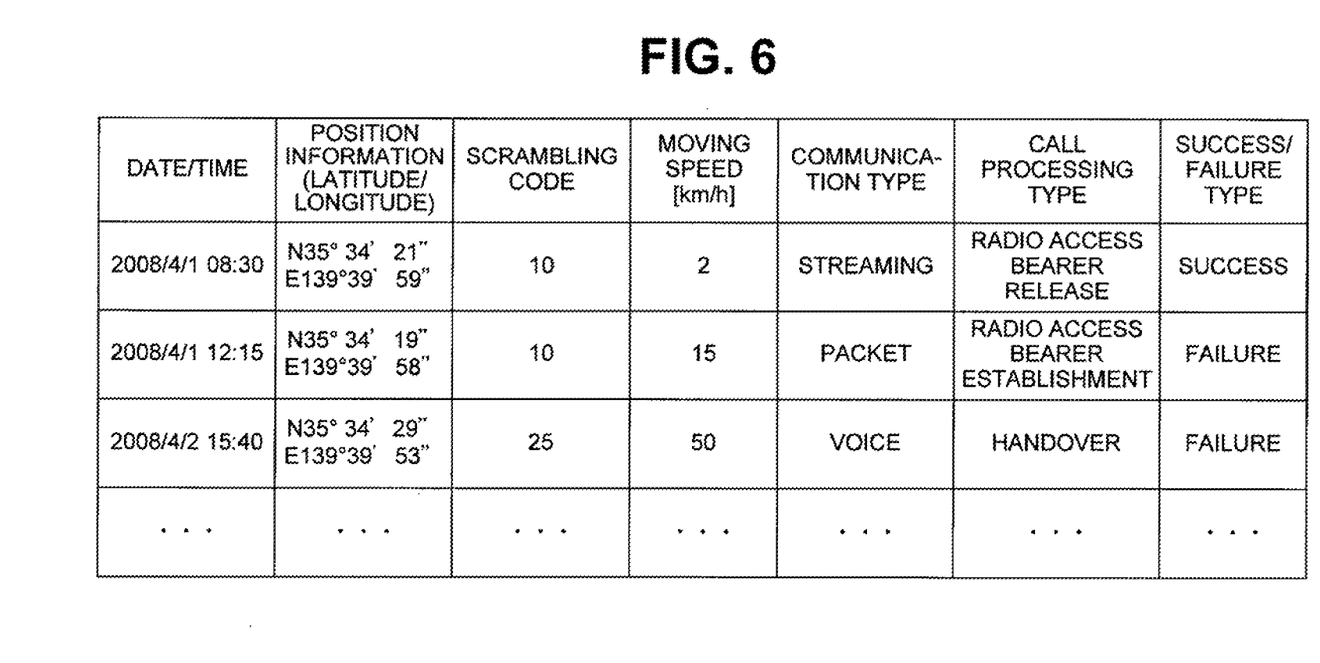
FIG. 6 is a view showing an example of terminal information stored in a terminal information storage unit according to the second exemplary embodiment of the present invention.

FIG. 6 shows an example of terminal information stored in the terminal information storage unit 902. In the example of FIG. 6, the terminal information storage unit 902 stores, as terminal information, the date/time of terminal information measurement in the mobile terminal, position information, a scrambling code, a moving speed, a communication type (for example, streaming, packet, or voice), a call processing type (for example, radio access bearer establishment, radio access bearer release, or handover), and a call processing success/failure type.

As the position information, not only the latitude and longitude but also horizontal rectangular coordinates or an address may be used. In a mobile communication network complying with the 3GPP specifications, the scrambling code is broadcast in a wireless cell via a BCH (Broadcast Channel). When combined with a location area code or a routing area code, the scrambling code can be used as position information to uniquely identify the wireless cell where the mobile terminal 30 exists.

Figure 7:
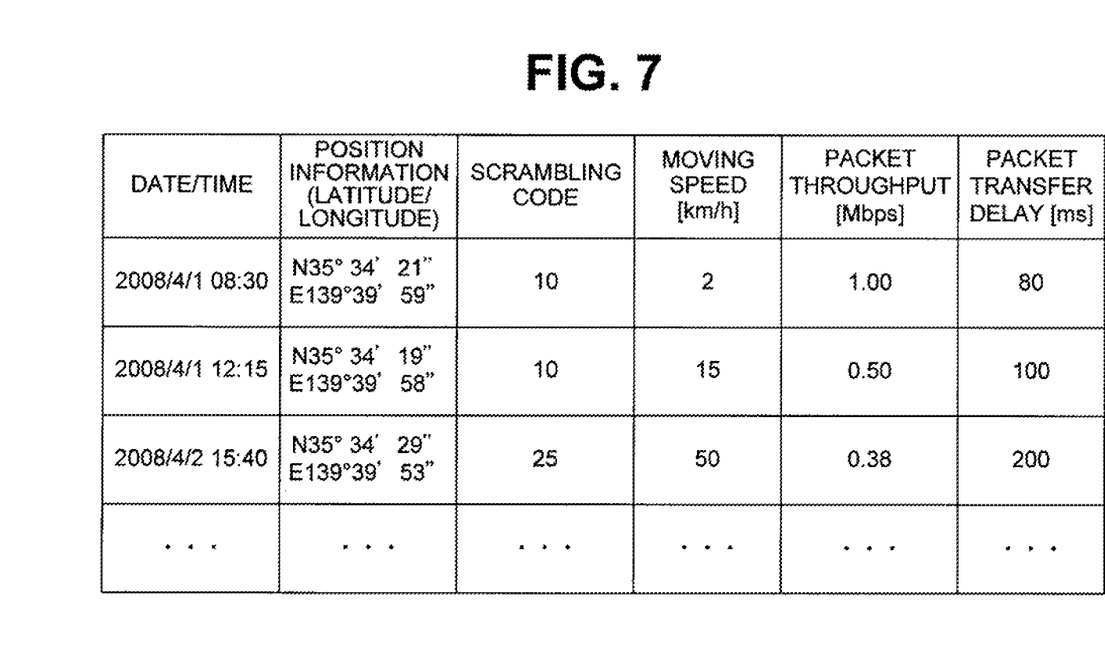
FIG. 7 is a view showing another example of the terminal information stored in the terminal information storage unit according to the second exemplary embodiment of the present invention.

FIG. 7 shows another example of terminal information stored in the terminal information storage unit 902. In the example of FIG. 7, the terminal information storage unit 902 stores, as terminal information, a packet throughput and a packet transfer delay upon packet communication in addition to the date/time of terminal information measurement in the mobile terminal, position information, a scrambling code, and a moving speed.

[Description of Operation]

Figure 8:
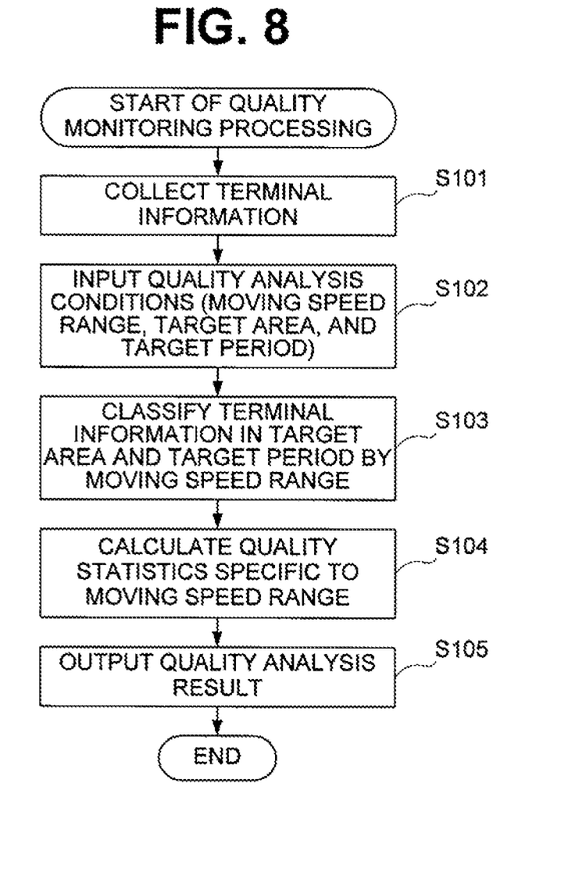
FIG. 8 is a flowchart illustrating an example of the operation of the quality monitoring apparatus according to the second exemplary embodiment of the present invention.

The operation of the quality monitoring apparatus 90 according to the second exemplary embodiment will be described next with reference to the flowchart of FIG. 8.

The terminal information collection unit 901 of the quality monitoring apparatus 90 collects terminal information from the mobile terminal 30 existing in the mobile communication network (step S101). Note that FIG. 3 illustrates only one mobile terminal 30 for the descriptive convenience. In fact, the system can target a plurality of mobile terminals 30 that are present in the area. As described above, the terminal information transmission time can be set to a predetermined period, a time designated by the terminal user, the communication end time, the time immediately after handover, or a time designated by the quality monitoring apparatus 90. This setting can be done by terminal information collection unit 901 for the mobile terminal 30. The terminal information collection unit 901 may collect terminal information from only mobile terminals existing in a specific area (for example, a specific wireless cell, an area under a specific wireless base station control apparatus, a specific prefecture or municipality, or a specific rectangular area).

The terminal information storage unit 902 stores the terminal information collected by the terminal information collection unit 901.

Next, the operator of the quality monitoring apparatus 90 inputs conditions for quality analysis (quality analysis conditions) via the input unit 905 (step S102). The quality analysis conditions include the moving speed range, the target area, and the target period. For example, as the moving speed range, a range of 0 km/h (inclusive) to 5 km/h (exclusive), 5 km/h (inclusive) to 20 km/h (exclusive), 20 km/h (inclusive) to 60 km/h (exclusive), 60 km/h (inclusive) to 100 km/h (exclusive), or 100 km/h or more is designated. As the target area, a specific wireless cell, an area under the specific wireless base station control apparatus 60, a specific prefecture or municipality, or a specific rectangular area is designated. As the target period, the range of measurement date/time of terminal information to be analyzed is designated.

Next, the terminal information classification unit 903 acquires terminal information in the target area and target period from the terminal information storage unit 902 in accordance with the quality analysis conditions input from the input unit 905, and classifies the acquired terminal information by the moving speed range based on the moving speed information included in the terminal information (step S103).

Next, the quality analyzing unit 904 receives the terminal information classified by the moving speed ramie from the terminal information classification unit 903, and obtains quality statistics for the moving speed range from the terminal information (step S104).

Finally, the output unit 906 outputs the quality analysis result of the quality analyzing unit 904 via an output device such as a display and ends the quality analysis processing (step S105).

Figure 9:
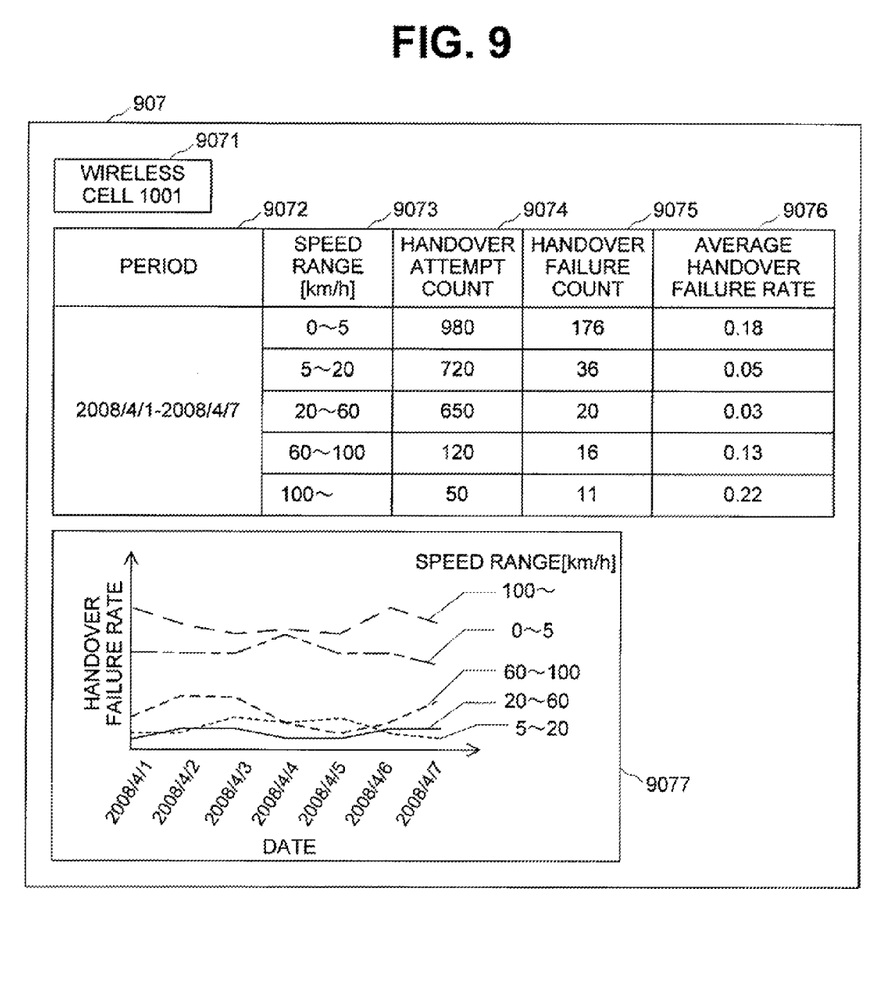
FIG. 9 is a view showing an example of a quality analysis result output screen according to the second exemplary embodiment of the present invention.

FIG. 9 shows an example of quality analysis result output by the output unit 906. FIG. 9 illustrates a screen that displays the quality analysis result. A screen 907 displays a target area 9071, a target period 9072, and moving speed ranges 9073 input as the quality analysis conditions. The screen 907 also displays handover attempt counts 9074 classified by the moving speed range, and handover failure counts 9075 classified by the moving speed range. The screen 907 also displays handover failure rates 9076 which are calculated as quality statistics for the respective moving speed ranges by dividing the handover failure counts for the moving speed ranges by the handover attempt counts for the moving speed ranges. The screen 907 displays, on the lower side, a time series graph 9077 that calculates the handover failure rate in days during the target period for each moving speed range.

Note that in the example of FIG. 9, the handover failure rate is used as an example of the quality statistics. However, the quality analyzing unit 904 can also calculate, as the quality statistics specific to each moving speed range, the radio access bearer establishment failure rate, the radio access bearer release failure rate, or the like by the same method as that for the handover failure rate. The quality analyzing unit 904 can also handle the packet transfer throughput or packet transfer delay as the quality statistics specific to each moving speed range. The packet transfer throughput and packet transfer delay are measured by the mobile terminal 30. Hence, to use the packet transfer throughput or packet transfer delay as the quality statistics, pieces of terminal information collected from a plurality of mobile terminals are classified by the moving speed range, and the average value of the packet transfer throughput or packet transfer delay is obtained for each moving speed range.

In the second exemplary embodiment of the present invention, the effects described in the first exemplary embodiment can be obtained in the above-described way.

[Third Exemplary Embodiment]

The third exemplary embodiment to practice the present invention will be described next in detail with reference to the accompanying drawings. The third exemplary embodiment is different from the second exemplary embodiment in that quality statistics specific to each moving speed range are obtained for each communication type. [Description of Arrangement]

A mobile communication network according to the third exemplary embodiment is the same as that of the second exemplary embodiment, and a description thereof will be made using the reference numerals in FIGS. 3 to 5.

[Description of Operation]

Figure 10:
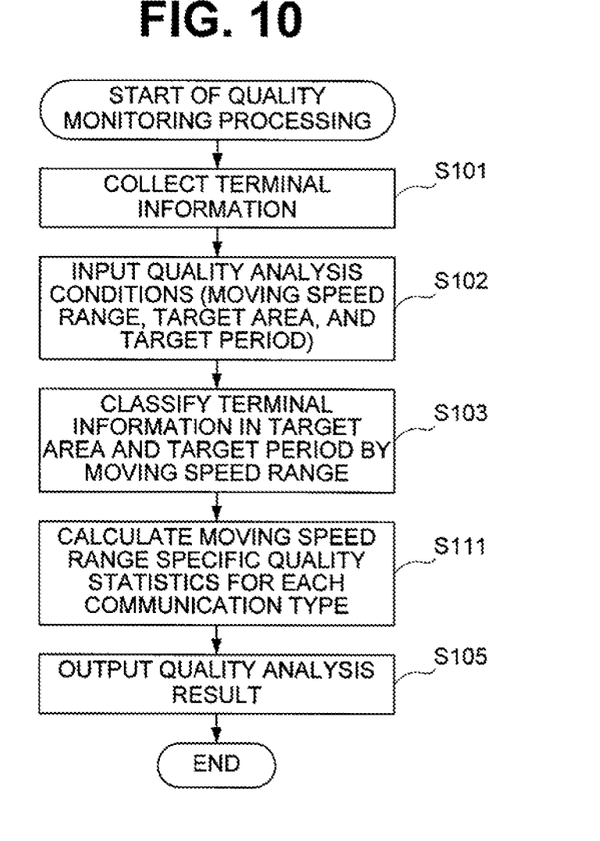
FIG. 10 is a flowchart illustrating an example of the operation of a quality monitoring apparatus according to the third exemplary embodiment of the present invention.

The operation of a quality monitoring apparatus 90 according to the third exemplary embodiment will be described with reference to the flowchart of FIG. 10. Note that the operations in steps S101 to S103 and 5105 are the same as in the second exemplary embodiment, and a detailed description thereof will not be repeated.

When obtaining quality statistics specific to each moving speed range, a quality analyzing unit 904 of the quality monitoring apparatus 90 according to this exemplary embodiment refers to the communication type information included in the terminal information and obtains the moving speed range specific quality statistics for each communication type (step S111). For example, since the communication types are voice, packet, streaming, and the like, the quality analyzing unit 904 obtains the moving speed range specific quality statistics for each communication type.

As described above, according to the third exemplary embodiment of the present invention, since the moving speed range specific quality statistics are obtained for each communication type, it is possible to monitor quality in accordance with the communication type that requires a different service level.

Note that at least some of the components of the mobile terminals 1 and 30 and the quality monitoring apparatuses 4 and 90 according to the first to third exemplary embodiments can be implemented by a computer including a CPU, a storage device, and an interface to the outside. The CPU executes processing as described in the first to third exemplary embodiments in accordance with programs stored in the storage device.

The present invention has been described above with reference to the exemplary embodiments. However, the present invention is not limited to the above-described exemplary embodiments. The form and details of the present invention can be implemented by appropriately combining the above-described exemplary embodiments. In addition, changes and modifications can also be made without departing from the spirit and scope of the present invention as defined by the claims.

INDUSTRIAL APPLICABILITY

The present invention is applicable to a quality monitoring system in a wireless communication network.

The invention claimed is:

1. A quality monitoring system in a wireless communication network, comprising:
    at least one mobile terminal; and
    a quality monitoring apparatus,
    said mobile terminal comprising:
    a measuring unit that measures at least a moving speed of a self terminal and communication quality of wireless communication; and a communication unit that transmits terminal information including moving speed information and communication quality information, and said quality monitoring apparatus comprising:

a terminal information collection unit that collects the terminal information from said at least one mobile terminal; and an analyzing unit that monitors communication quality in a predetermined target area for each moving speed range of said mobile terminal based on the collected terminal information and obtains quality statistics specific to each moving speed range in the predetermined target area by statistically processing moving speed information and communication quality information included in the collected terminal information.

2. A quality monitoring system in a wireless communication network according to claim 1, wherein said analyzing unit of said quality monitoring apparatus comprises:

a terminal information storage unit that stores the terminal information collected from said at least one mobile terminal;

a terminal information classification unit that classifies the terminal information of said mobile terminal existing in the predetermined target area by the moving speed range based on the moving speed information included in the terminal information stored in said terminal information storage unit; and a quality analyzing unit that obtains quality statistics specific to each moving speed range in the predetermined target area based on the terminal information classified by the moving speed range.

3. A quality monitoring system in a wireless communication network according to claim 2, wherein said measuring unit of said mobile terminal comprises:

a speed measuring unit that measures the moving speed of the self terminal;

a quality measuring unit that measures the communication quality of the wireless communication; and a positioning unit that measures a position of the self terminal, said communication unit of said mobile terminal transmits the terminal information including the moving speed information, the communication quality information, and position information, and said terminal information classification unit of said quality monitoring apparatus acquires, from said terminal information storage unit, the terminal information of the mobile terminal existing in the predetermined target area based on the position information included in the terminal information stored in said terminal information storage unit.

4. A quality monitoring system in a wireless communication network according to claim 2, wherein the communication quality information includes at least one of pieces of information of a call processing type, a call processing success/failure type, a packet transfer throughput, and a packet transfer delay.

5. A quality monitoring system in a wireless communication network according to claim 2, wherein the terminal information further includes communication type information, and said quality analyzing unit of said quality monitoring apparatus obtains the quality statistics specific to each moving speed range by referring to the communication type information included in the terminal information stored in said terminal information storage unit.

6. A quality monitoring system in a wireless communication network according to claim 5, wherein the communication type information represents one of voice communication, packet communication, and streaming communication.

7. A quality monitoring system in a wireless communication network according to claim 2, wherein said quality monitoring apparatus further comprises an input unit that inputs quality analysis conditions, and said terminal information classification unit acquires terminal information corresponding to the quality analysis conditions from said terminal information storage unit, and classifies the acquired terminal information by the moving speed range.

8. A quality monitoring system in a wireless communication network according to claim 7, wherein the quality analysis conditions designate the moving speed range, a target area, and a target period.

9. A quality monitoring system in a wireless communication network according to claim 2, wherein said quality monitoring apparatus further comprises an output unit that outputs the quality statistics specific to each moving speed range in the predetermined target area and a time series graph of the quality statistics specific to each moving speed range.

10. A quality monitoring apparatus in a wireless communication network, comprising:

a terminal information collection unit that collects, from at least one mobile terminal, terminal information including at least moving speed information and communication quality information; and an analyzing unit that monitors communication quality in a predetermined target area for each moving speed range of the mobile terminal based on the collected terminal information and obtains quality statistics specific to each moving speed range in the predetermined target area by statistically processing moving speed information and communication quality information included in the collected terminal information.

11. A quality monitoring apparatus in a wireless communication network according to claim 10, wherein said analyzing unit comprises:

a terminal information storage unit that stores the terminal information collected from the at least one mobile terminal;

a terminal information classification unit that classifies the terminal information of the mobile terminal existing in the predetermined target area by the moving speed range based on the moving speed information included in the terminal information stored in said terminal information storage unit; and a quality analyzing unit that obtains quality statistics specific to each moving speed range in the predetermined target area based on the terminal information classified by the moving speed range.

12. A quality monitoring apparatus in a wireless communication network according to claim 11, wherein the terminal information further includes position information;

said terminal information classification unit acquires, from said terminal information storage unit, the terminal information of the mobile terminal existing in the predetermined target area based on the position information included in the terminal information stored in said terminal information storage unit.

13. A quality monitoring apparatus in a wireless communication network according to claim 11, wherein the communication quality information includes at least one of pieces of information of a call processing type, a call processing success/failure type, a packet transfer throughput, and a packet transfer delay.

14. A quality monitoring apparatus in a wireless communication network according to claim 11, wherein
the terminal information further includes communication type information, and
said quality analyzing unit obtains the quality statistics specific to each moving speed range by referring to the communication type information included in the terminal information stored in said terminal information storage unit.

15. A quality monitoring apparatus in a wireless communication network according to claim 14, wherein the communication type information represents one of voice communication, packet communication, and streaming communication.

16. A quality monitoring apparatus in a wireless communication network according to claim 11, further comprising an input unit that inputs quality analysis conditions;
wherein said terminal information classification unit acquires terminal information corresponding to the quality analysis conditions from said terminal information storage unit, and classifies the acquired terminal information by the moving speed range.

17. A quality monitoring apparatus in a wireless communication network according to claim 16, wherein the quality analysis conditions designate the moving speed range, a target area, and a target period.

18. A quality monitoring apparatus in a wireless communication network according to claim 11, further comprising an output unit that outputs the quality statistics specific to each moving speed range in the predetermined target area and a time series graph of the quality statistics specific to each moving speed range.

19. A quality monitoring method in a wireless communication network, comprising:
the measuring procedure of causing at least one mobile terminal to measure at least a moving speed of a self terminal and communication quality of wireless communication;
the transmission procedure of causing the mobile terminal to transmit terminal information including moving speed information and communication quality information;
the terminal information collection procedure of causing a quality monitoring apparatus to collect the terminal information from the at least one mobile terminal; and
the analyzing procedure of causing the quality monitoring apparatus to monitor communication quality in a predetermined target area for each moving speed range of the mobile terminal based on the collected terminal information and obtaining quality statistics specific to each moving speed range in the predetermined target area by statistically processing moving speed information and communication quality information included in the collected terminal information.

20. A quality monitoring system in a wireless communication network, comprising:
at least one mobile terminal; and
a quality monitoring apparatus, said mobile terminal comprising:
measuring means for measuring at least a moving speed of a self terminal and communication quality of wireless communication; and
communication means for transmitting terminal information including moving speed information and communication quality information, and said quality monitoring apparatus comprising:
terminal information collection means for collecting the terminal information from said at least one mobile terminal; and
analyzing means for monitoring communication quality in a predetermined target area for each moving speed range of said mobile terminal based on the collected terminal information and for obtaining quality statistics specific to each moving speed range in the predetermined target area by statistically processing moving speed information and communication quality information included in the collected terminal information.

21. A quality monitoring apparatus in a wireless communication network, comprising:
terminal information collection means for collecting, from at least one mobile terminal, terminal information including at least moving speed information and communication quality information; and
analyzing means for monitoring communication quality in a predetermined target area for each moving speed range of the mobile terminal based on the collected terminal information and for obtaining quality statistics specific to each moving speed range in the predetermined target area by statistically processing moving speed information and communication quality information included in the collected terminal information.

* * * * *

UNITED STATES PATENT AND TRADEMARK OFFICE
CERTIFICATE OF CORRECTION

| | | |
|---|---|---|
| PATENT NO. | : 8,639,238 B2 | Page 1 of 1 |
| APPLICATION NO. | : 13/063857 | |
| DATED | : January 28, 2014 | |
| INVENTOR(S) | : Kosei Kobayashi and Yasuhiko Matsunaga | |

It is certified that error appears in the above-identified patent and that said Letters Patent is hereby corrected as shown below:

On the Title Page,
please add:
(30) Foreign Application Priority Data
2008-291841 (JP) ----------- 11/14/2008

Signed and Sealed this
Second Day of September, 2014

Michelle K. Lee
*Deputy Director of the United States Patent and Trademark Office*